United States Patent
Risheq

(10) Patent No.: US 8,337,697 B2
(45) Date of Patent: Dec. 25, 2012

(54) MULTI-COMPARTMENT WATER PURIFICATION BOTTLE HAVING A REPLACEABLE FILTER

(75) Inventor: Tareq Adel Risheq, Laguna Niguel, CA (US)

(73) Assignee: SimpliPure, Inc., Newport Beach, CA (US)

( * ) Notice: Subject to any disclaimer, the term of this patent is extended or adjusted under 35 U.S.C. 154(b) by 309 days.

(21) Appl. No.: 12/704,258

(22) Filed: Feb. 11, 2010

(65) Prior Publication Data

US 2010/0219151 A1    Sep. 2, 2010

Related U.S. Application Data

(60) Provisional application No. 61/156,437, filed on Feb. 27, 2009, provisional application No. 61/157,473, filed on Mar. 4, 2009, provisional application No. 61/211,162, filed on Mar. 26, 2009, provisional application No. 61/259,039, filed on Nov. 6, 2009.

(51) Int. Cl.
B01D 35/027    (2006.01)

(52) U.S. Cl. ........ 210/245; 210/469; 210/472; 210/474; 210/484; 210/489; 210/496; 210/497.3; 210/501; 210/502.1

(58) Field of Classification Search .............. 210/244, 210/245, 464, 467, 469, 472, 474, 484, 485, 210/489, 497.3, 282, 496, 501, 502.1; 222/189.06, 222/189.08, 189.11
See application file for complete search history.

(56) References Cited

U.S. PATENT DOCUMENTS

| | | | |
|---|---|---|---|
| 4,605,499 A | 8/1986 | Wise | |
| 4,764,274 A | 8/1988 | Miller | |
| 5,049,272 A * | 9/1991 | Nieweg | 210/266 |
| 5,840,185 A * | 11/1998 | Hughes et al. | 210/232 |
| 5,989,424 A * | 11/1999 | Serenko et al. | 210/266 |
| 6,004,460 A * | 12/1999 | Palmer et al. | 210/232 |
| 6,117,319 A | 9/2000 | Cranshaw | |
| 6,200,471 B1 | 3/2001 | Nohren, Jr. | |
| 6,478,956 B2 | 11/2002 | Kaura | |
| 6,565,743 B1 | 5/2003 | Poirier et al. | |
| 2002/0036176 A1* | 3/2002 | Hughes et al. | 210/767 |
| 2008/0023396 A1* | 1/2008 | Fugetsu | 210/502.1 |
| 2008/0093309 A1 | 4/2008 | Mecham | |
| 2009/0145839 A1* | 6/2009 | Miga, Jr. | 210/466 |

* cited by examiner

*Primary Examiner* — Matthew Savage
(74) *Attorney, Agent, or Firm* — Fish & Associates, PC

(57) ABSTRACT

A bottle comprises a cap, a reservoir having an open top closeable by the cap, and a filter holder that houses a filter, the filter holder being coupled to the cap such that a liquid in the reservoir is filtered by the filter as the liquid is being consumed, and the filter is fluidly decoupled from the reservoir when the cap is disengaged from the reservoir. Preferred filters can be constructed out of high reactivity carbon mixture, activated carbon, iodinated resin, combinations thereof, or any other suitable compositions for filtering water or other liquids, and can be molded into any suitable size and shape. Preferred filter holder can have a top portion and a bottom portion that couple together via a snap fitting, mating threads, or any suitable means, which allow access to the filter, and which have numerous vents that allow liquid to freely flow through the filter.

8 Claims, 11 Drawing Sheets

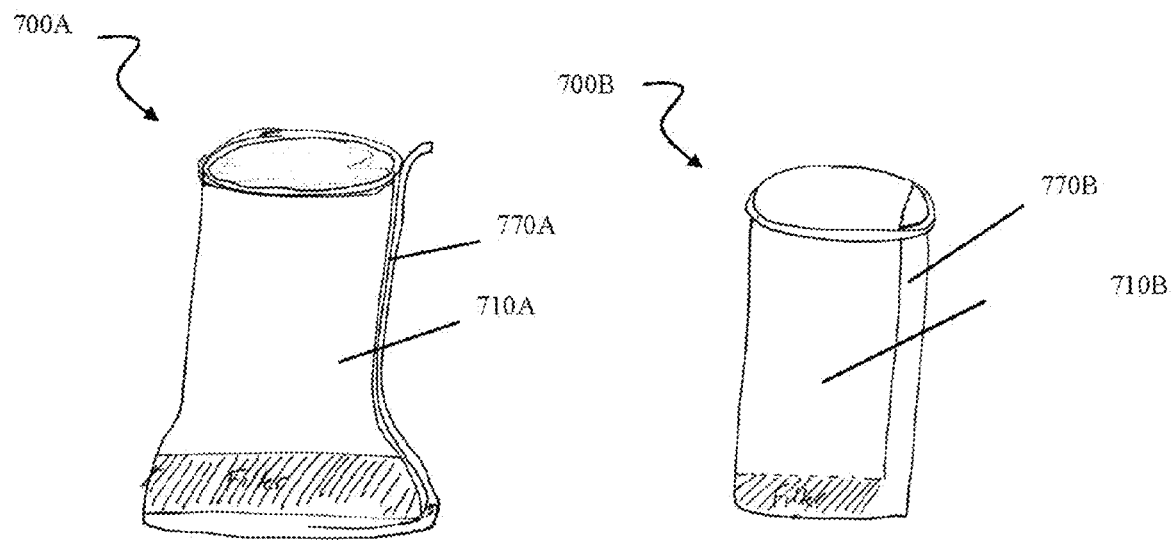
Figure 9A
Figure 9B
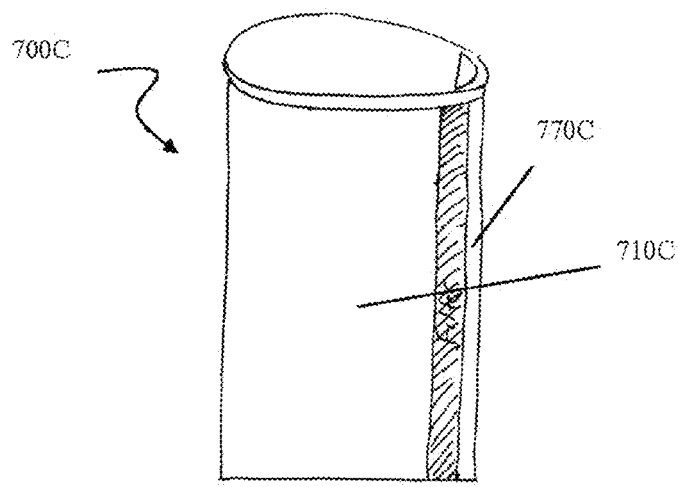
Figure 9C

MULTI-COMPARTMENT WATER PURIFICATION BOTTLE HAVING A REPLACEABLE FILTER

This application claims priority to: (a) U.S. Provisional Application No. 61/156,437, filed Feb. 27, 2009; (b) U.S. Provisional Application No. 61/157,473, filed Mar. 4, 2009; (c) U.S. Provisional Application No. 61/211,162, filed Mar. 26, 2009; and (d) U.S. Provisional Application No. 61/259,039, filed Nov. 6, 2009, each of which are incorporated herein by reference in their entity.

FIELD OF THE INVENTION

The field of the invention is bottles, and more specifically water bottles having a filtration system.

BACKGROUND

Water bottles are well known in the art, and generally consist of a compressible water reservoir having a bottle neck to which a nozzle or cap is coupled. Many different water bottle designs have been developed over the years for numerous purposes. Recently, there has been a significant increase in demand for bottled water, and it is known to incorporate a filtration device within a water bottle.

For example, U.S. Pat. No. 5,609,759 to Nohren Jr. teaches a water bottle having a tube of filtering material with porous side walls coupled to a cap, the filter material being inserted through an open neck of the bottle. One problem is Nohren's filter tube must be relatively long and/or contain very little filter material in order to pass through the opening of the water bottle.

U.S. Pat. No. 6,004,460 to Palmer teaches another water bottle having an filter permanently secured to the neck portion of the bottle. Palmer's bottle also includes an opening in the bottom of the bottle through which water may be added. A major problem with the Palmer design is that the bottle must be turned upside down for adding water, and since the filter is permanently secured to the interior of the bottle, the entire bottle must be replaced each time the filter is expended.

Nohren and Palmer and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Thus, there is still a need for a multi-compartment bottle having a replaceable filter.

SUMMARY OF THE INVENTION

The present invention provides apparatus, systems and methods in which a bottle comprises: (1) a cap having a dispensing portion; (2) a reservoir having an open top closeable by the cap; and (3) a filter holder that houses a filter, the filter holder being coupled to the cap such that a liquid in the reservoir is filtered by the filter as the liquid is being consumed, and the filter is fluidly decoupled from the reservoir when the cap is disengaged from the reservoir.

Preferred filters can be constructed out of high reactivity carbon mixture (HRCM), activated carbon, iodinated resin, combinations thereof, or any other suitable compositions for filtering water or other liquids. Contemplated filters can be capable of reducing contaminants in the water or other liquids by at least 90%, and more preferably at least 95%, and most preferably at least 99%. Preferred filters can be molded into a cone, concave frustoconical shape, or any other suitable size and dimension. It is also contemplated that the filter could be in a granular form and contained within a mesh bag or other replaceable cartridge.

Preferred filter holder can have a cylindrical or frustoconical shape, but any other suitable size and dimension is within the scope of the present invention. Preferred filter holder can have a top portion and a bottom portion that couple together via a snap fitting, mating threads, or any other suitable means, which allow access to the filter. In addition, the top and bottom portions of filter holder can have numerous vents that allow liquid to freely flow through the filter. The number, size and placement of vents can vary depending on the desired application of the filter and the design of filter holder.

Various objects, features, aspects and advantages of the inventive subject matter will become more apparent from the following detailed description of preferred embodiments, along with the accompanying drawings in which like numerals represent like components.

BRIEF DESCRIPTION OF THE DRAWINGS

FIG. 9A depicts still another alternative bottle having a bottom filter.

FIG. 9B depicts yet another alternative bottle having an alternative bottom filter.

FIG. 9C depicts still another alternative bottle having an alternative side wall filter.

DETAILED DESCRIPTION

In the following description, reference is made to the accompanying drawings that show, by way of illustration, specific embodiments in which the invention may be practiced. These embodiments are described in sufficient detail to enable those skilled in the art to practice the invention, but it should be understood that other embodiments may be utilized and structural changes may be made without departing from the scope of the present invention.

Figure 1:
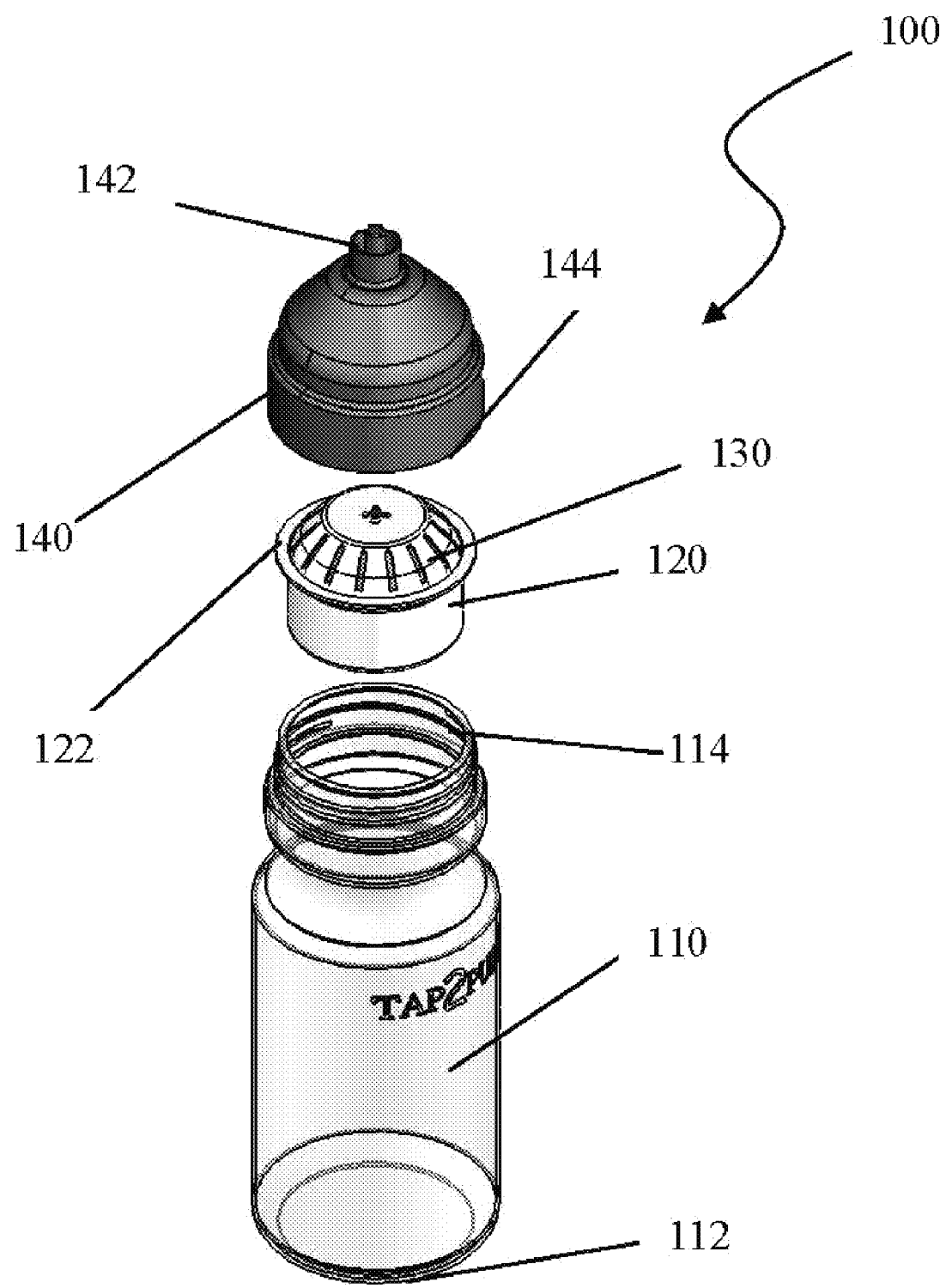
FIG. 1 is a side perspective view of a preferred embodiment of the bottle.
Figure 2:
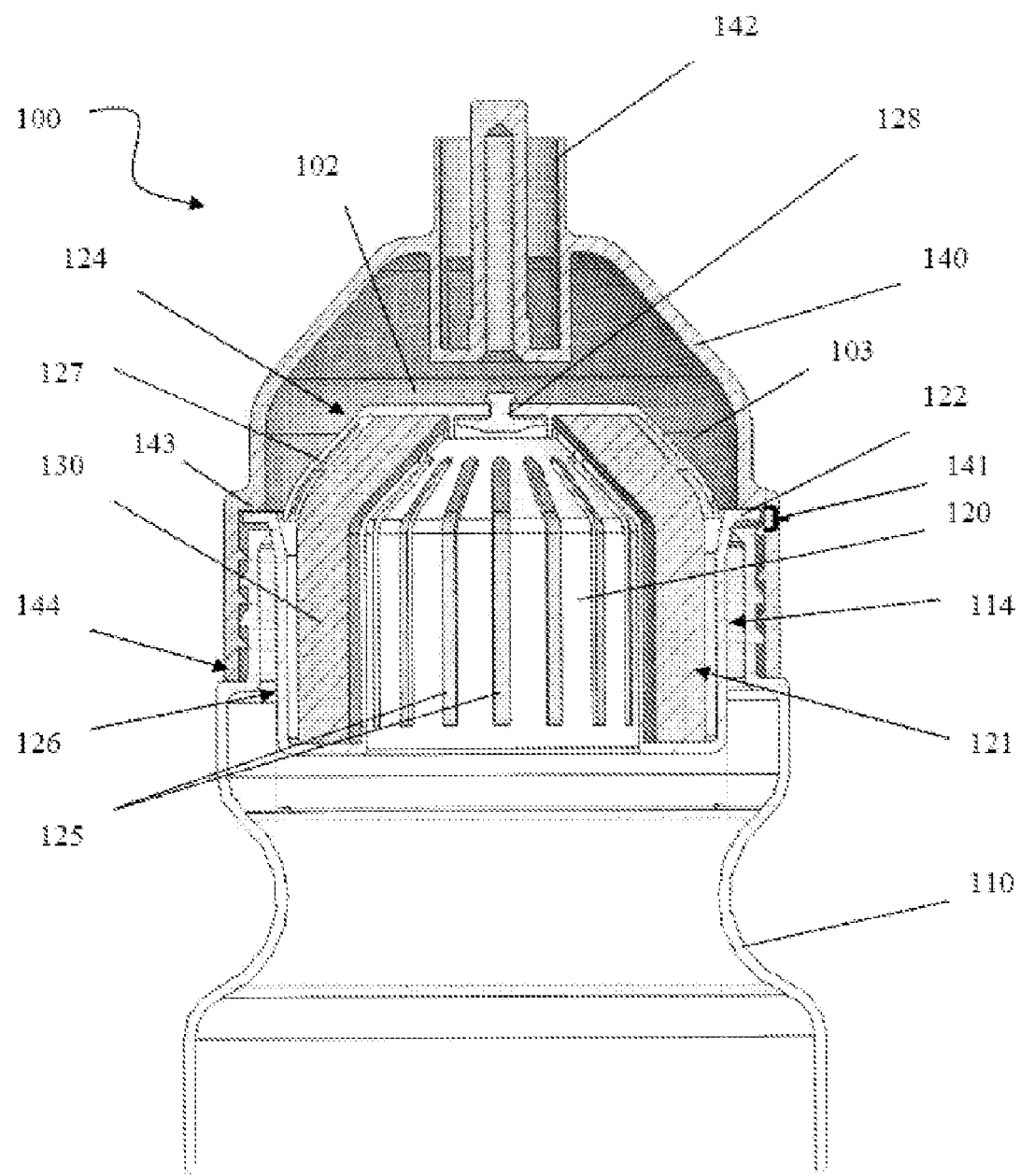
FIG. 2 is a cross sectional view of the bottle of FIG. 1.

FIGS. 1 and 2 depict preferred bottle 100 having a reservoir 110, filter holder 120, filter 130, and cap 140.

It is contemplated that reservoir 110 and cap 140 can be constructed out of polyethylene, polypropylene, polyvinyl chloride, polyethylene terepthalate, or any other suitable natural and synthetic polymer, and is preferably flexible. Reservoir 110 has a closed base portion 112 and an open top 114. Reservoir 110 can have any suitable size and dimension for holding liquids. In addition, it is contemplated that reservoir 110 can also include a grip portion on the outside of the bottle (not shown), such as grip indentations or any suitable material that will allow a user to more easily grip the bottle 100.

Preferred cap 140 has a dispensing end 142 and open end 144 that couples with the open top 114 of reservoir 110. Cap 140 can have a conical or frustoconical shape or any other suitable size and dimension. In preferred embodiments, open top 114 of reservoir 110 has male threads that couple with female threads on the open end 144 of cap 140. It is also contemplated that the reservoir 110 and cap 140 can be mechanically coupled together via a snap fitting, a quick release mechanism, magnetic coupling, or any other suitable means known in the art that are capable of coupling reservoir 110 with cap 140. In addition, dispensing end 142 can control the release of fluid via a pressure nozzle, a pull nozzle, a flip top, a screw cap, pull-off cap, or any other suitable end for dispensing liquid.

Preferred filter 130 can be constructed out of high reactivity carbon mixture (HRCM), activated carbon, iodinated resin, combinations thereof, or any other suitable compositions for filtering water or other liquids. High Reactivity Carbon Mixture (HRCM) is manufactured by a unique method of cold autocatalytic decomposition of graphite, which results in the formation of a carbon-based nano-material. HRCM has an extremely large specific surface area (2,500 $m^2$/per 1 g HRCM). The surface of this material consists of atomic layers of cyclic carbon (graphenes) with damaged molecular bonds. HRCM is a chemically inert substance, electro conductive, hydrophobic, stable in corrosive environments and ecologically clean. Depending on the manufacturing method, HRCM can consist of 99.4% pure carbon materials with a bulk density of 0.01-0.001 $g/cm^3$. Filter 130 can have a pore size of at least 0.2 to 100 microns, preferably 1 to 25 microns. HRCM can remove particles including but not limited to sulphates, sulphides, fluorides, chlorides, nitrites, iron, zinc, copper, aluminum, manganese, lead, arsenic, molybdenum, and other small particles suspended in water. HRCM is also capable of removing microorganisms, such as bacteria and viruses, and to prevent reproduction of microorganisms HRCM can be coated with particles of silver and iodine. Filter 130 carbon filter block having a cylindrical shaped lower portion and a frustoconical shaped upper portion. Moreover, filter 130 can be molded into a cone, concave or frustoconical shape, or any other suitable size and dimension. It is also contemplated that filter 130 could be in a granular form and contained within a mesh bag or other replaceable cartridge.

Preferred filter holder 120 can be constructed out of polyethylene, polypropylene, polyvinyl chloride, polyethylene terephthalate, or any other suitable natural and synthetic polymer. As shown in FIG. 2, holder 120 can have a cylindrical or frustoconical shape, but any other suitable size and dimension is within the scope of the present invention. In some embodiments, filter holder 120 can have a frustoconical tubular shaped top portion 124 and a tubular bottom portion 126 comprising inner and outer tubular walls. The inner tubular wall includes a plurality of vents and the outer tubular wall is imperforate. The top portion 124 can comprise a disc-shaped surface 102, and a frustoconical ring shaped surface 103 with a plurality of vents extending there through. It is contemplated that filter holder 120 can have a flange 122 or other suitable coupling means, including but not limited to, threaded and magnetic couplings, which allow filter holder 120 to mate with an interior surface of cap 140 to assist a user in refilling the bottle. As shown in FIG. 2, flange 122 can be annular and extend radially outward from the bottom portion 126. Flange 122 couples with an inner ring 141 having an inner annular shoulder 143 on cap 140 that will allow the filter holder 120 to snap into the interior of the cap 140. As shown in FIG. 2, filter holder 120 couples with bottle 100, such that a tubular wall of a bottom portion 126 is disposed with the open top of reservoir 110 of bottle 100, while top portion is disposed within cap 140 of the bottle.

Figure 3A:
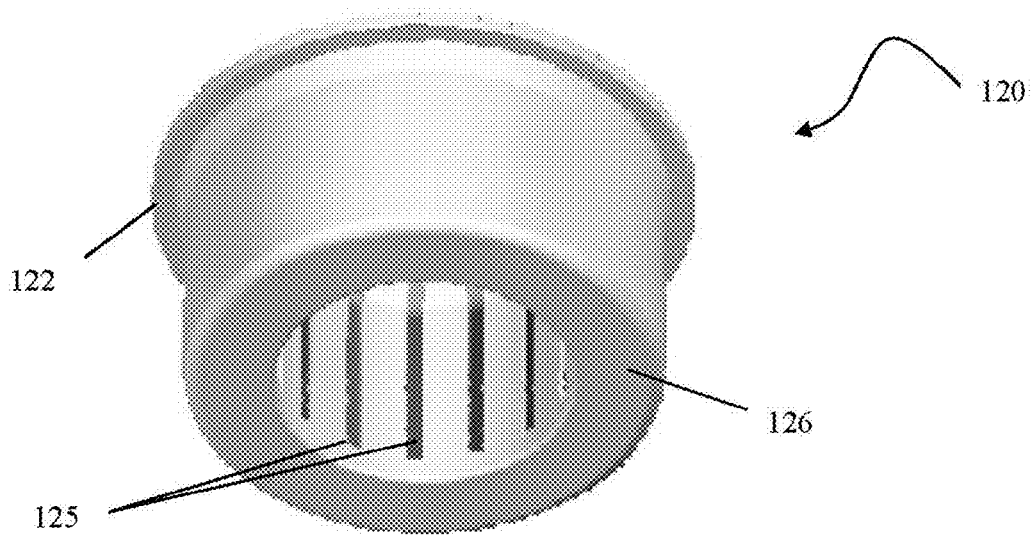
FIG. 3A is a bottom perspective view of the preferred filter holder of FIG. 1.
Figure 3B:
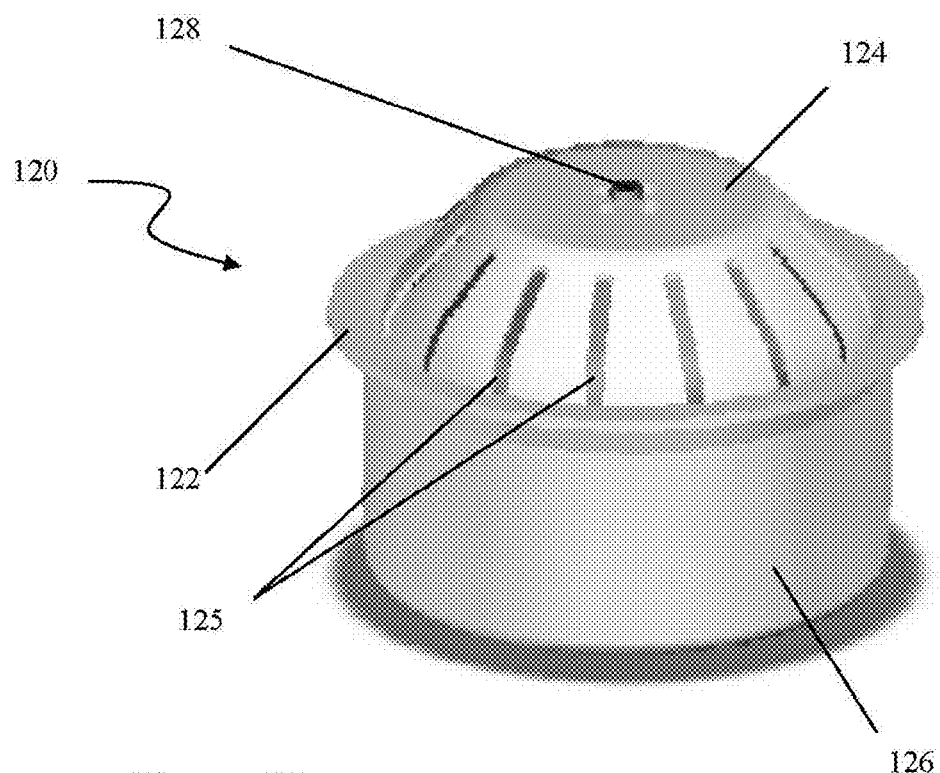
FIG. 3B is a top perspective view of the preferred filter holder of FIG. 1.
Figure 3C:
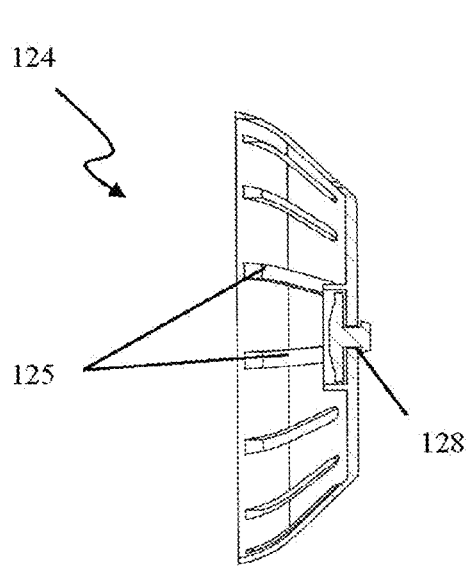
FIG. 3C is cross sectional view of a preferred embodiment of the top portion of the filter holder of FIG. 3B.
Figure 3D:
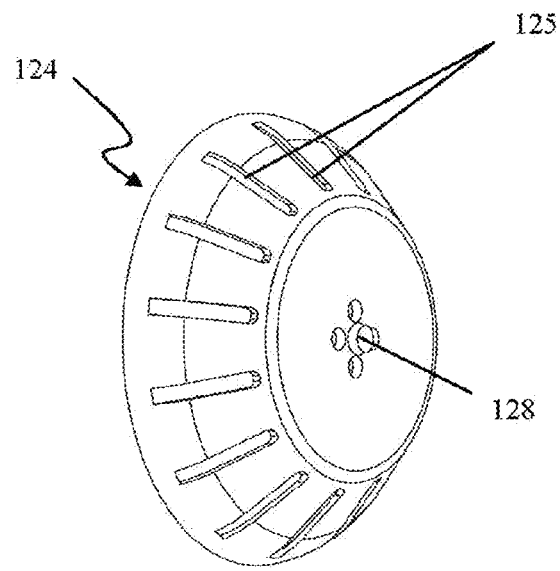
FIG. 3D is a perspective view of a preferred embodiment of the top portion of the filter holder of FIG. 3B.
Figure 3E:
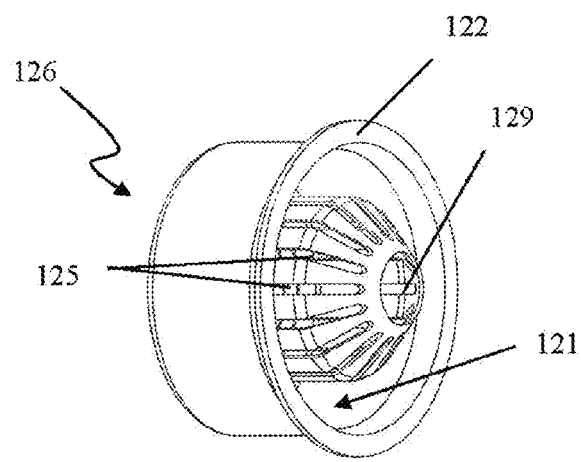
FIG. 3E is a perspective view of a preferred embodiment of the bottom portion of the filter holder of FIG. 3B.
Figure 3F:
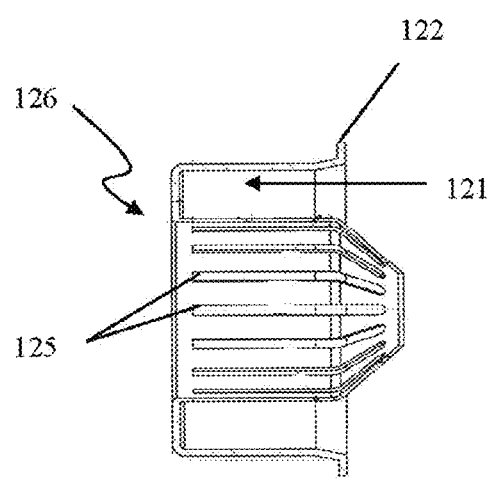
FIG. 3F is a cross sectional view of a preferred embodiment of the bottom portion of the filter holder of FIG. 3B.

FIGS. 3A-F depict a preferred filter holder 120 having a top portion 124 and a bottom portion 126 that couple together via a snap fitting, mating threads, or any suitable means, which allow access to filter 130 for maintenance or replacement. As shown in FIGS. 2, 3E and F the bottom portion 126 of the filter holder 120 contains a circular slot 121 for receipt of filter 130, but the size and dimension of slot 121 can vary depending on the design of the filter 130 and the filter holder 120. Filter 120 fits within slot 121 of bottom portion 126 such that top portion 124 mates with bottom portion 126 to encapsulate filter 130. It is further contemplated that top portion 124 can have an impact ring 127 to protect filter 130 from breakage during an inverted drop of bottle 100.

Preferred top portion 124 of the filter holder 120 can have a pressure equalization valve 128 that allows air to flow back into reservoir 110 after a user squeezes bottle 100, but it is also contemplated that value 128 could be incorporated into reservoir 110 or cap 140. As shown in FIG. 3E, bottom portion 126 of filter holder 120 also contains an opening 129 that allows the pressure equalization valve 128 to freely operate.

As shown in FIGS. 3A-F the top and bottom portions 124 and 126 of filter holder 120 can have numerous vents 125 that allow liquid to freely flow through filter 130. The number, size and placement of vents 125 can vary depending on the desired application of filter 130 and the design of filter holder 120. It is contemplated that vents 125 can be located on a top portion 124 and/or a bottom portion 126 of filter holder 120. For example, a filter holder could comprise a plurality of vent on both a top portion and an inner tubular wall of a bottom portion, as shown in FIGS. 3A through 3F.

Figure 4:
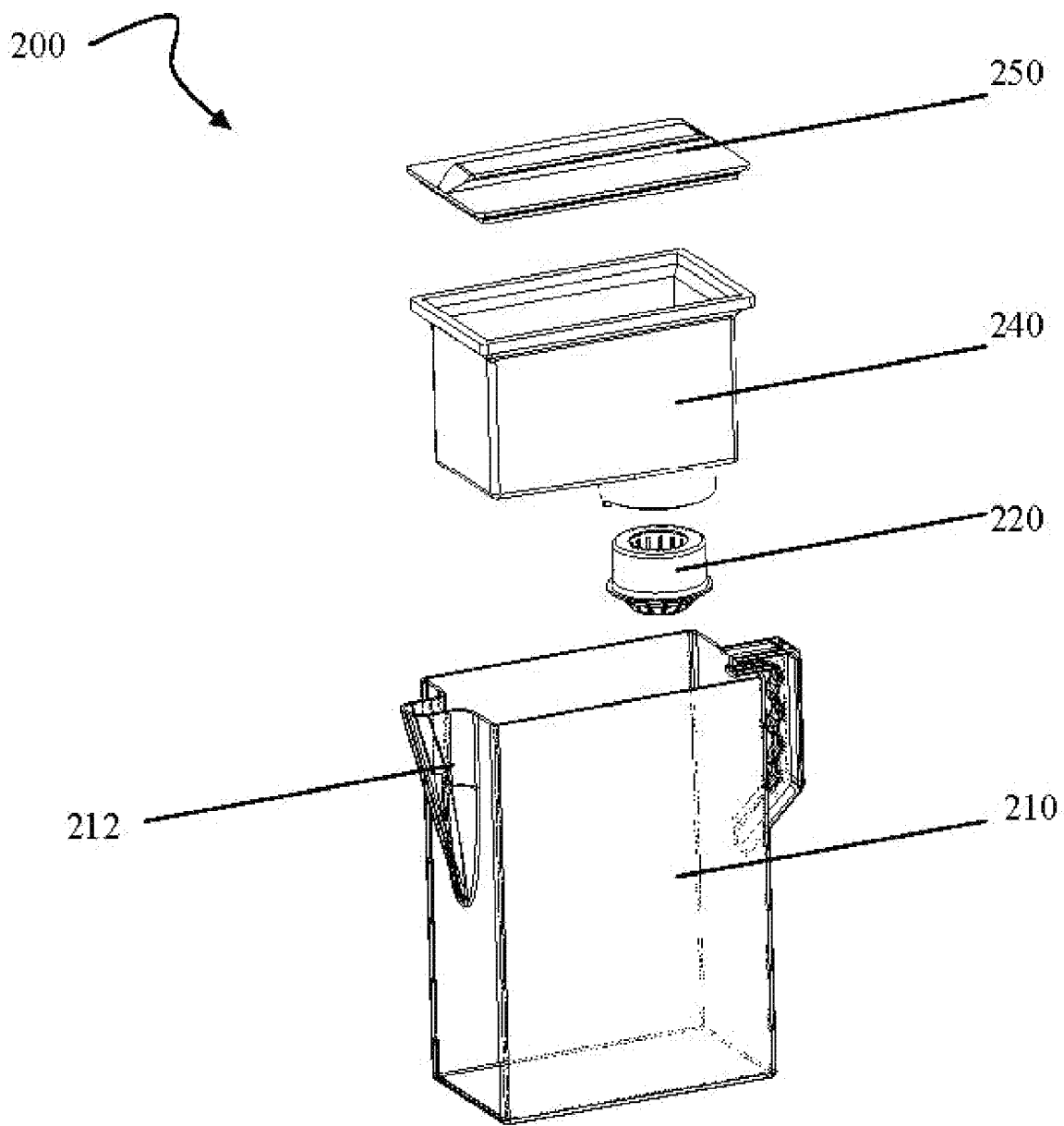
FIG. 4 depicts an alternative bottle.

FIG. 4 depicts an alternative bottle 200 having a reservoir 210, filter holder 220, filtering reservoir 240, and lid 250. In this embodiment, filtering reservoir 240 allows a user to pour liquid into filtering reservoir 240 which then allows liquid to flow through the filter holder 220 and into the reservoir 210. Dispensing portion 212 allows a user to dispense the filtered liquid.

Figure 5:
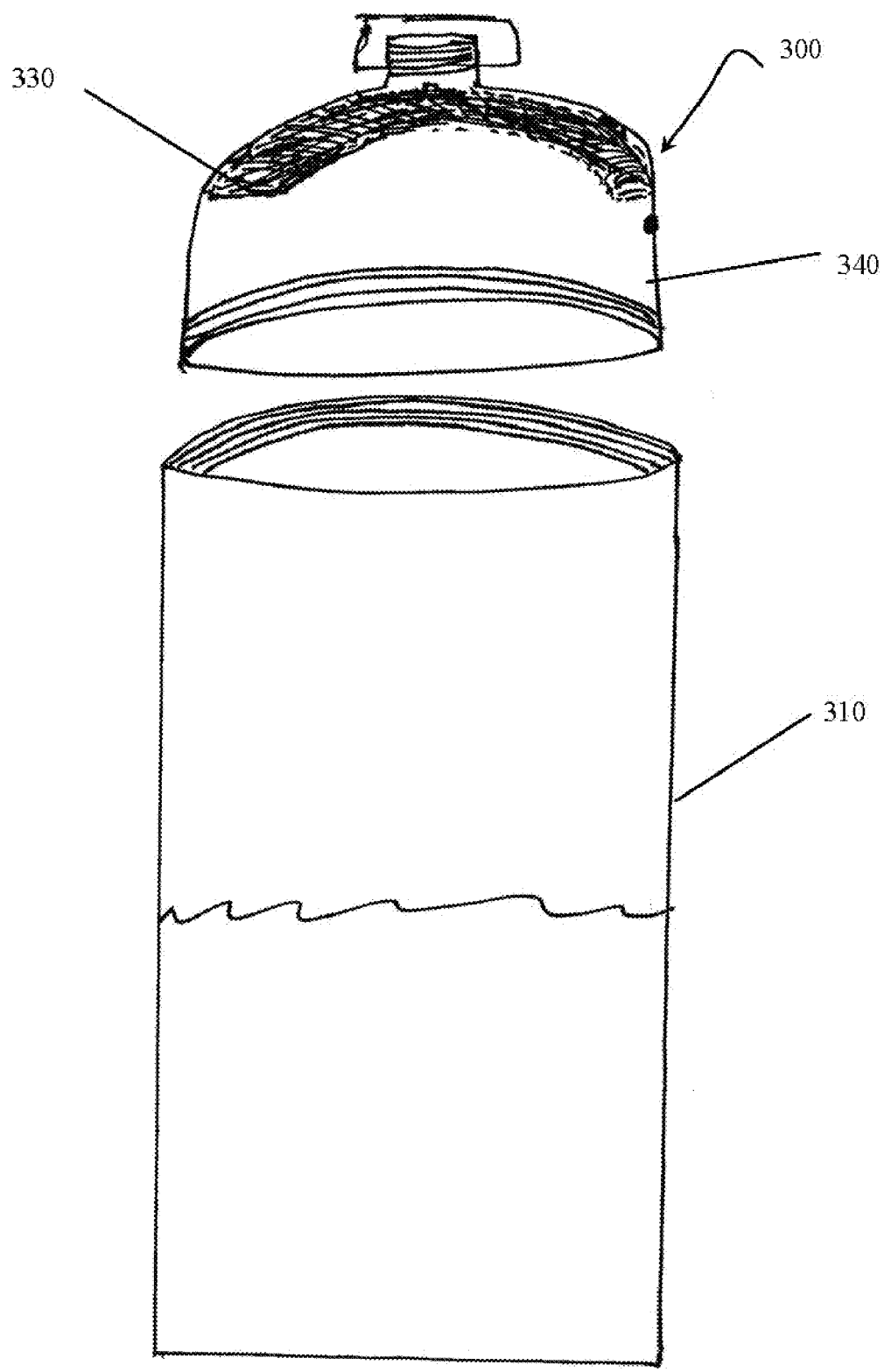
FIG. 5 is a cross sectional view of another alternative bottle.

FIG. 5 depicts another alternative bottle 300 having a reservoir 310 and cap 340 in which filter 330 can be securely attached to an interior surface of cap 340 via a snap fitting, quick release mechanism, or any other suitable means known in the art.

Figure 6:
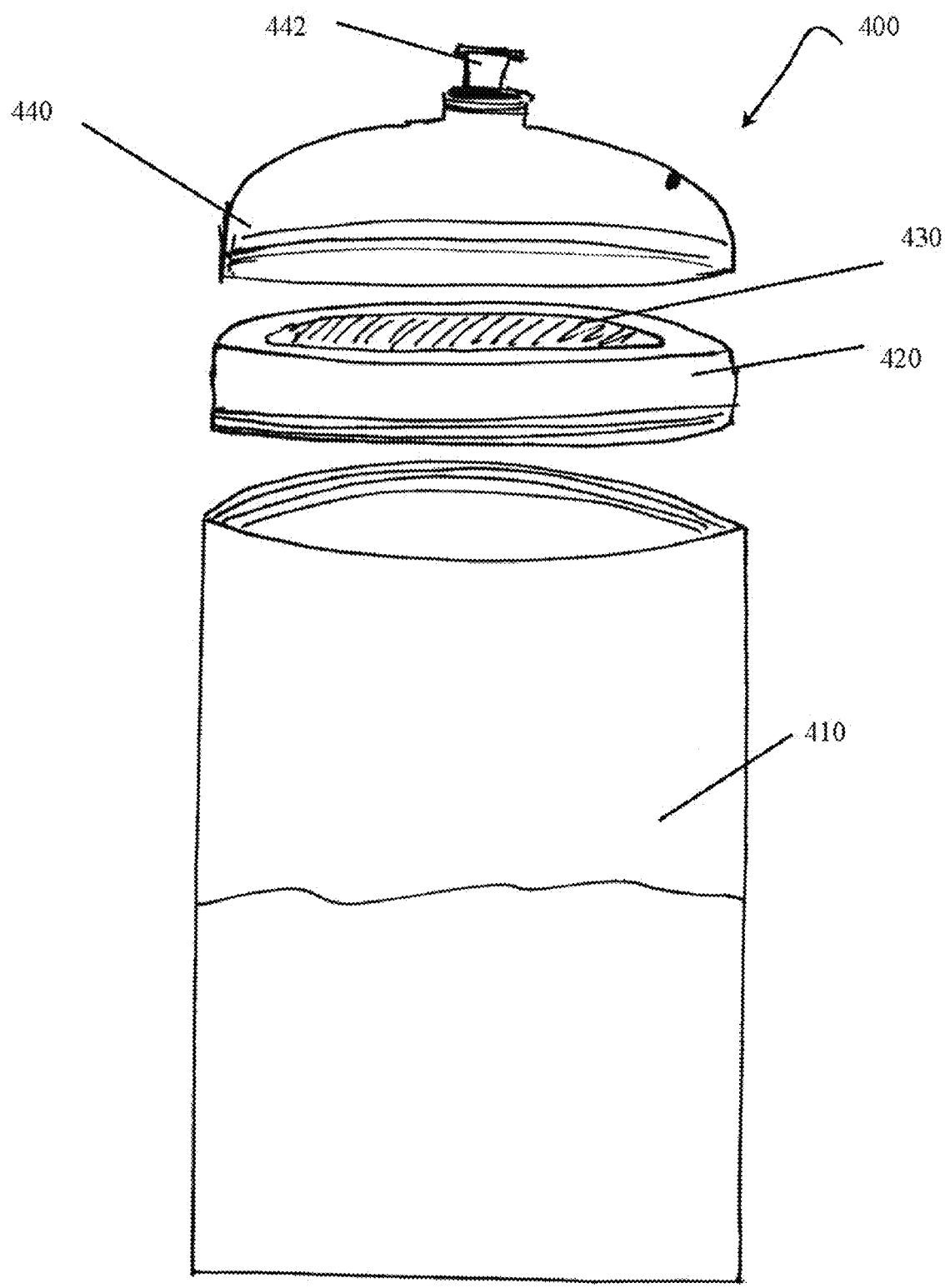
FIG. 6 is a cross sectional view of still another alternative bottle.

FIG. 6 depicts still another alternative bottle 400 having a reservoir 410, filter holder 420, filter 430, and cap 440. In this embodiment, filter holder 420 is sized and dimensioned as a flat disc and filter 430 is molded into a flat disc, which fits securely within filter holder 420. In this embodiment cap 440 is depicted as having a pull nozzle 442 for dispensing liquid contained within reservoir 410.

Figure 7:
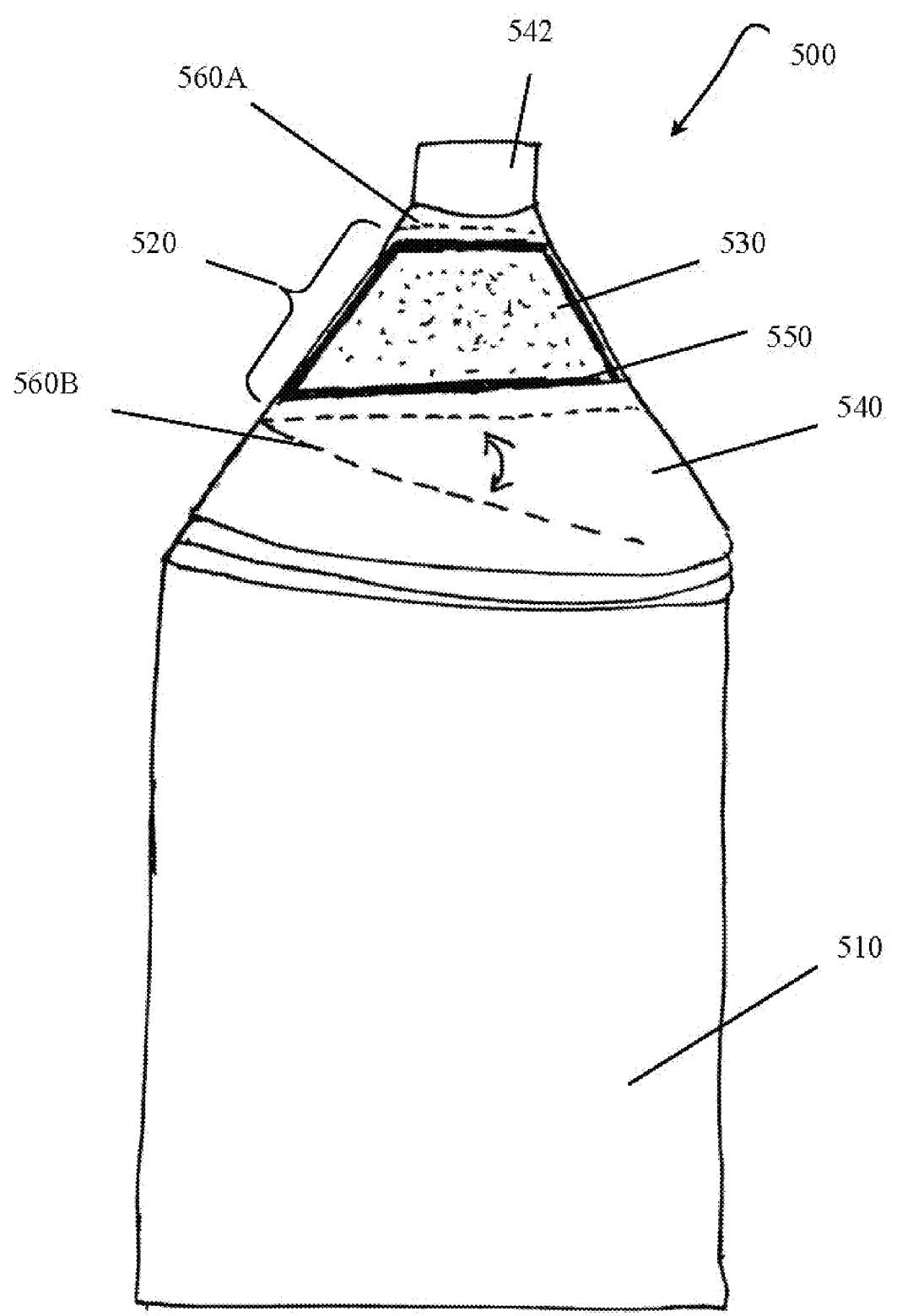
FIG. 7 is a cross sectional view of yet another alternative bottle.

FIG. 7 depicts yet another alternative bottle 500 having a reservoir 510, filter holder 520, filter 530 housed with a mesh bag 550, and cap 540. In this embodiment, filter holder 520 is defined by partitions 560A and 560B, both of which are permeable. Partition 560A is fixedly attached to an interior surface of cap 540, whereas partition 560B is removable or alternatively can be hinged open to allow a user to replace mesh bag 550. Partition 560B separates filter 530 and reservoir 510 while allowing the reservoir to be fluidly coupled to the dispensing portion 442. It is also contemplated that the filter material 530 contained within mesh bag 550 could be flavored. All flavorings are contemplated that are suitable for use with filter material 530.

Figure 8:
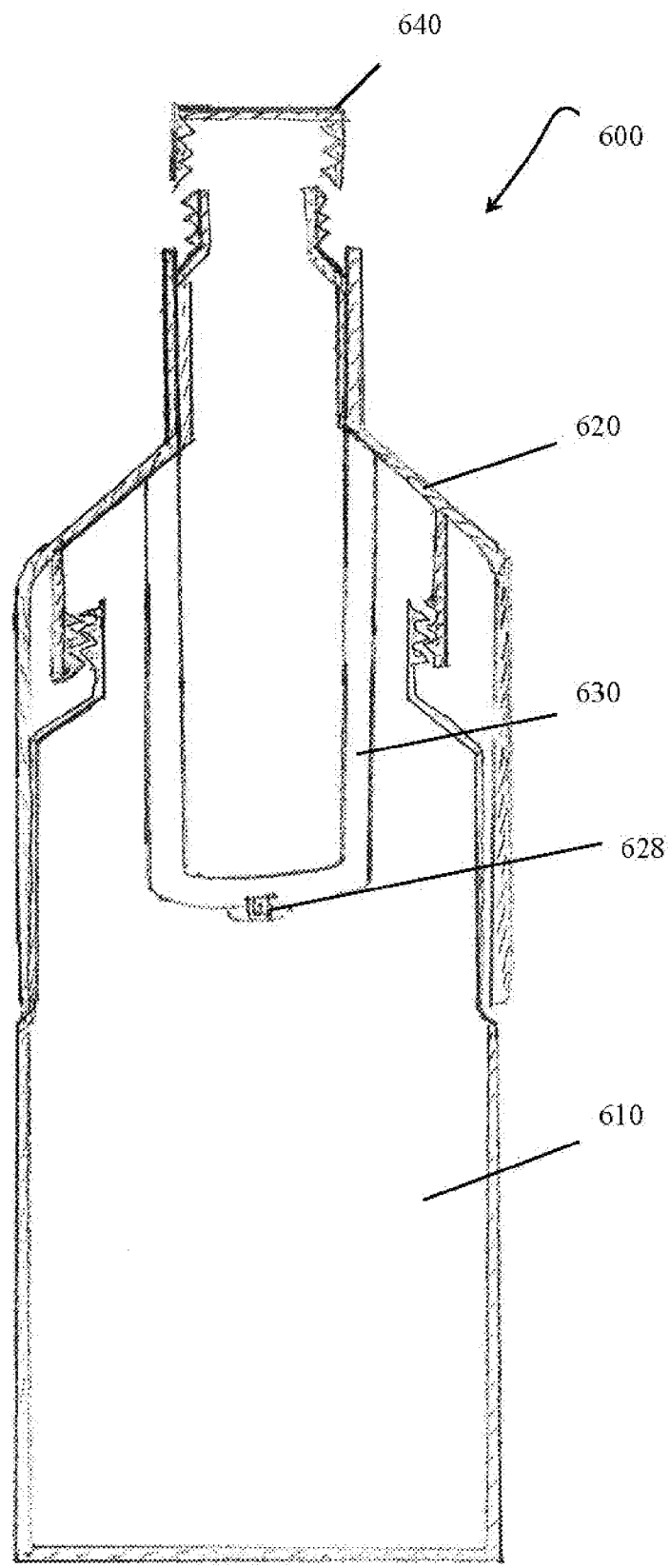
FIG. 8 depicts another alternative bottle.

FIG. 8 depicts still another alternative bottle 600 having a reservoir 610, a filter holder 620, and an inverted cylinder shaped hollow filter 630 that is securely coupled to filter holder 620. In this embodiment, pressure value 628 is built into filter 630 to allow pressure relief.

FIGS. 9A-C shows alternative bottles 700A-C. FIG. 9A depicts bottle 700A having a filter 730A in the bottom of reservoir 710A, which filters liquid as it passes through filter 730A and into an external side passageway 770A that extends upwardly along an exterior side of the reservoir 710A. FIG. 9B depicts bottle 700B having a filter 730B in the bottom of reservoir 710B, which filters liquid as it passes through filter 730B and into an internal side passageway 770B that extends upwardly along an interior side of the reservoir 710B. FIG. 9C depicts bottle 700C having a side wall filter 730C in reservoir 710C, which filters liquid as it passes through filter 730C and into side passageway 770C that extends upwardly along an interior side of the reservoir 710C.

Figure 10:
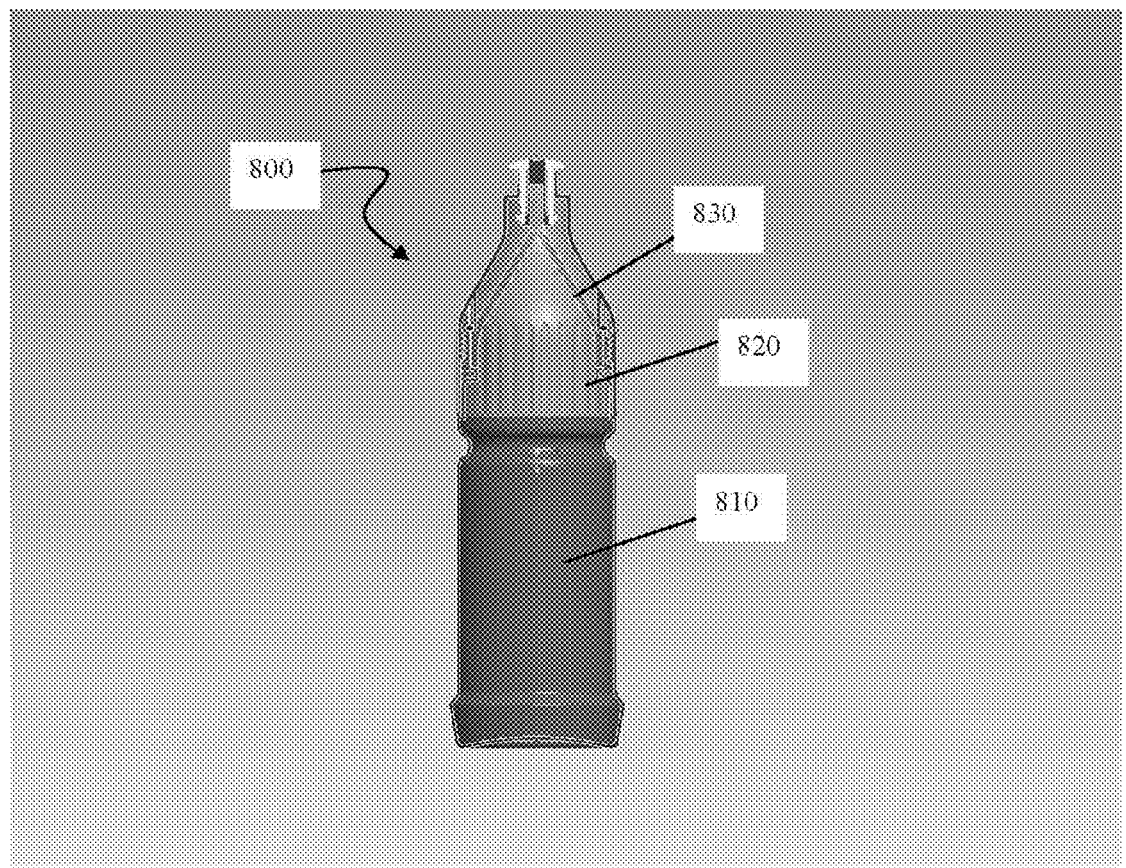
FIG. 10 depicts another alternative bottle having a cone shaped filter.

FIG. 10 depicts yet one more alternative bottle 800 having a reservoir 810 and a filter holder 820, in which a cone shaped filter 830 is coupled to the filter holder 820 by a quick release mechanism (not shown).

Thus, specific embodiments and applications of a water purification bottle have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A bottle, comprising:
a cap having a dispensing portion, internal threading, and an inner ring having an inner annular shoulder;
a reservoir having an open top and external threading that mates with the internal threading;
a carbon filter block having a cylindrical shaped lower portion and a frustoconical shaped upper portion;
a filter holder for housing the carbon filter block comprising a frustoconical tubular shaped top portion coupled with a lower portion, the filter holder being coupled to the cap such that a liquid in the reservoir is filtered by the filter block as the liquid is being consumed, and the filter is fluidly decoupled from the reservoir when the cap is disengaged from the reservoir;
wherein the top portion comprises a pressure equalization valve;
wherein the frustoconical shaped top portion includes (i) a disc-shaped surface for
enclosing the frustoconical shaped upper portion of the filter block and (ii) a frustoconical ring shaped surface with a plurality of vents extending therethrough adjacent an exterior surface of the upper portion of the filter block;
an annular flange extending radially outward from an upper portion of the outer imperforate tubular wall, wherein the annular flange is disposed between an upper rim of the open top of the reservoir and the inner annular shoulder of the cap;
wherein the lower portion of the filter holder includes an inner tubular wall with a plurality of vents extending therethrough and having a shape that conforms with an inner surface of the cylindrical shaped lower portion and frustoconical shaped upper portion of the filter block;
wherein the imperforate tubular wall of the filter holder is disposed within the open top of the reservoir; and
wherein the upper portion of the filter holder is disposed within the cap.

2. The bottle of claim 1, wherein the reservoir further comprises an outer grip portion comprising a grip indentation.

3. The bottle of claim 1, wherein the top portion of the filter holder further comprises an impact ring.

4. The bottle of claim 1, wherein the dispensing portion is a pull nozzle.

5. The bottle of claim 1, wherein the filter block contains a high reactivity carbon mixture.

6. The bottle of claim 1, wherein the filter block further comprises at least one of activated carbon, high reactivity carbon mixture, and iodinated resin.

7. The bottle of claim 1, wherein the filter block is capable of reducing contaminants in the liquid by at least 99%.

8. The bottle of claim 1, wherein the filter block can remove particles that are at least 2 microns in size.

* * * * *